Figure 16:
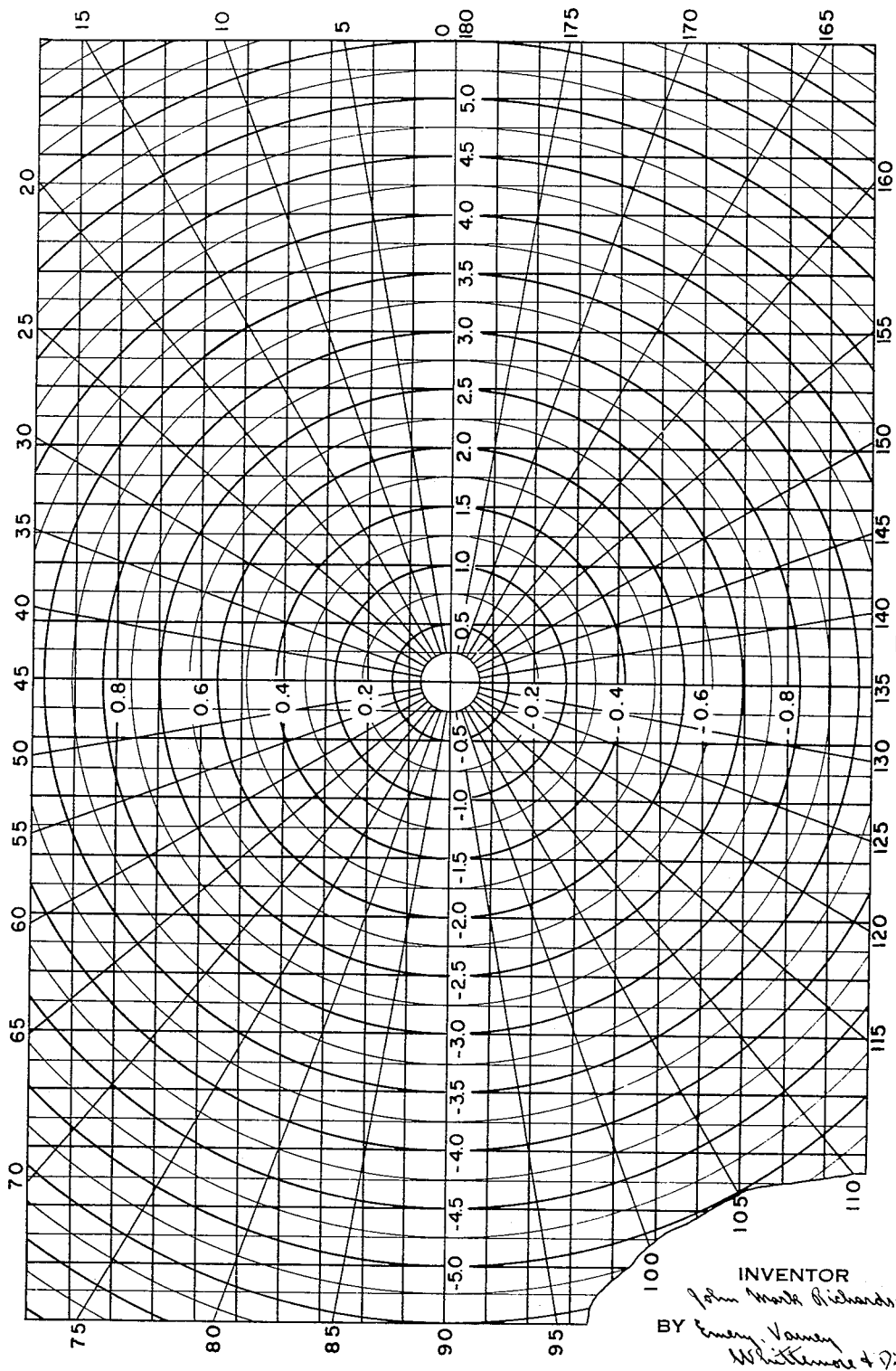

May 29, 1956     J. M. RICHARDS     2,747,458
STEREOSCOPIC TARGETS WITH DIAGONAL MARKINGS
Original Filed Aug. 14, 1947     2 Sheets-Sheet 1
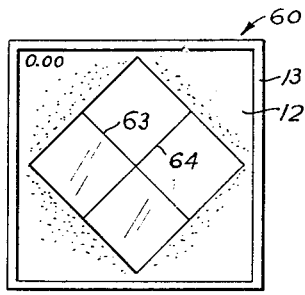
FIG. 1.
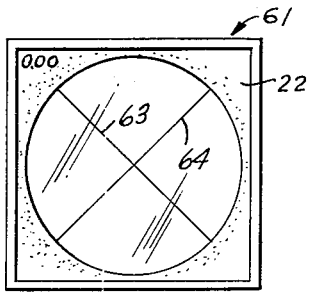
FIG. 2.
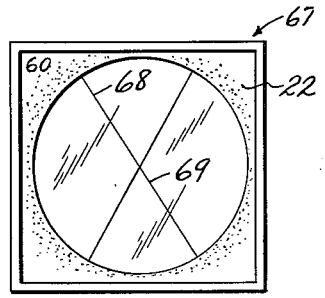
FIG. 3.
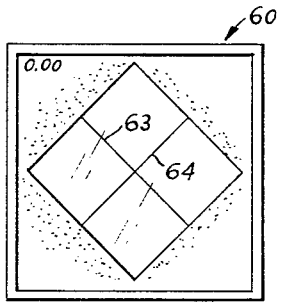
FIG. 5.
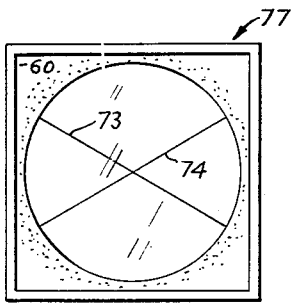
FIG. 6.
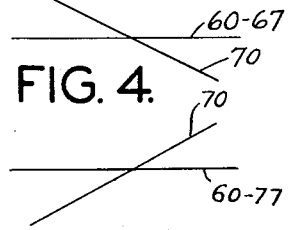
FIG. 4.
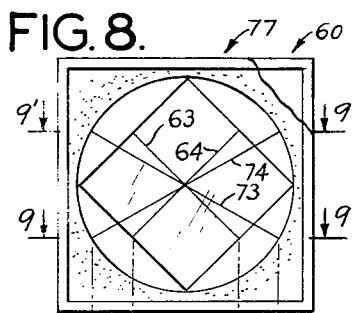
FIG. 8.
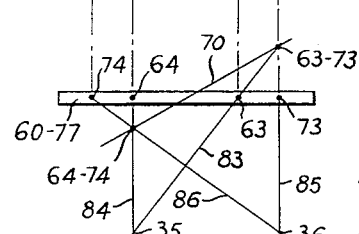
FIG. 9.
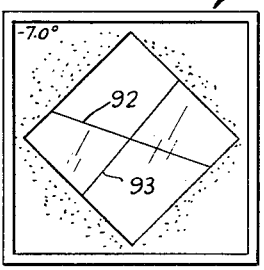
FIG. 10.
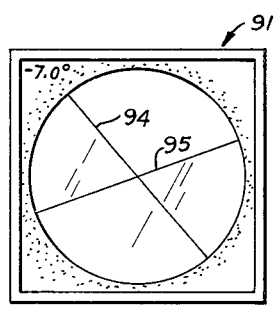
FIG. 11.
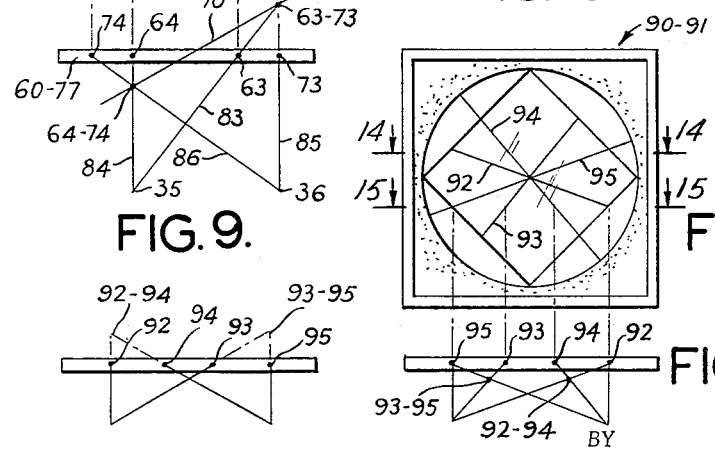
FIG. 12.
FIG. 14.
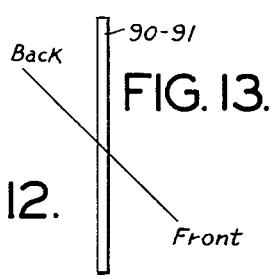
FIG. 13.
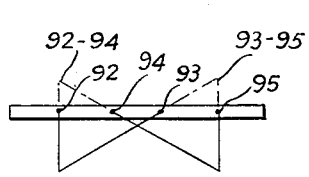
FIG. 15.
INVENTOR.
John Mark Richards
BY Emery Varney
Whittemore & Diy
ATTORNEYS.

May 29, 1956     J. M. RICHARDS     2,747,458
STEREOSCOPIC TARGETS WITH DIAGONAL MARKINGS
Original Filed Aug. 14, 1947     2 Sheets-Sheet 2

INVENTOR
John Mark Richards
BY Emery Varney
Whittemore & Dix
ATTORNEYS

United States Patent Office 2,747,458
Patented May 29, 1956

2,747,458

STEREOSCOPIC TARGETS WITH DIAGONAL MARKINGS

John M. Richards, Santa Barbara, Calif.

Original application August 14, 1947, Serial No. 768,672, now Patent No. 2,603,124, dated July 15, 1952. Divided and this application January 15, 1952, Serial No. 266,507

8 Claims. (Cl. 88—20)

This invention relates to the testing of eyes with depth perception or stereoscopic targets.

It is an object of the invention to provide improved means for testing eyes for asymmetrical tonic extraocular muscle imbalance, which is designated as "anisophoria." The invention comprises a set of targets including "zero" targets in which the same arrangement of diagonal lines is displayed to each eye, and the set includes other targets having the diagonal lines at slightly different angles from those of the "zero" targets, and from each other, with designations on the respective slides indicating the percentage of magnification represented by the different targets when they exactly compensate for unequal magnification of the patient's eyes.

Another object of the invention is to provide an improved set of eye testing targets for use with the targets disclosed in my co-pending application Ser. No. 768,672, filed August 14, 1947, now Patent No. 2,603,124, of which this application is a division. Some of the clinical data for determining prescriptions for glasses is obtained by subtracting certain data obtained with the targets of my co-pending application from other data representing compound conditions as measured by the targets of this invention.

It is another object of the invention to provide an improved method of testing eyes by means of depth perception targets. The method obtains data for use with formulae or graphs that indicate the prescription for correcting the defects caused by the asymmetrical tonic muscle imbalance.

Other objects, features and advantages of the invention will appear or be pointed out as the description proceeds.

In the drawing, forming a part hereof, in which like reference characters indicate corresponding parts in all the views, Figs. 1 and 2 show the zero targets of the preferred embodiment of this invention, Fig. 3 shows another target of the set which is used in place of the right eye zero target shown in Fig. 2, the diagonal lines on the target of Fig. 3 being so correlated with those of the zero target of Fig. 1 that the plane of the diagonal markings will appear to be turned nearer to the observer's right side than left when the targets are viewed stereoscopically, Fig. 4 is a diagrammatic top view showing the apparent plane defined by the diagonal lines of Figs. 1 and 3 when the targets of those figures are viewed stereoscopically, Figs. 5 and 6 show the zero target of Fig. 1 with another target having its diagonal lines so correlated with those of the zero target that the apparent plane of the lines is turned nearer to the observer's left side than to his right when the targets are viewed stereoscopically, Fig. 7 is a diagrammatic top plan view showing the apparent plane of the lines of the targets of Figs. 5 and 6 when these targets are viewed stereoscopically, Fig. 8 shows the targets of Figs. 5 and 6 superimposed upon one another, Fig. 9 is a sectional view on the line 9—9 of Fig. 8, and a graphic solution showing the way in which the correlation of the lines on the superimposed targets produces an apparent turning of the plane of the diagonal lines, Figs. 10 and 11 are front views of other targets for testing variable torsional tonic imbalance, Fig. 12 is a front view showing the targets of Figs. 10 and 11 superimposed upon one another, Fig. 13 is a diagrammatic side view illustrating the apparent tilt of the plane of the diagonal lines of the targets of Fig. 12 when those targets are viewed stereoscopically, Figs. 14 and 15 are diagrammatic sectional views on the lines 14—14 and 15—15, respectively, of Fig. 12, showing graphic solutions for the depth perception effects obtained by the correlation of lines shown in Fig. 12, and Fig. 16 is a chart for deriving a prescription from the clinical data obtained with the targets.

Figs. 1 and 2 show two targets, preferably lantern slides 60 and 61 which comprise the zero targets of the series. These targets 60 and 61 have masks 12 and 22, respectively, which are incongruent so that when the patient's left eye views the target 60 only, and the right eye views the target 61 only, the eyes cannot fuse the outlines of the target fields. When the targets are lighted from behind, the patient sees only the fields bounded by the masks 12 and 22, and diagonal lines 63 and 64 on these fields.

Although the lines 63 and 64 are at an angle of the order of 45 degrees to the vertical, the lines on these zero targets can be at other angles, and the term "diagonal" is used herein to designate a sloping line, that is, a line that is not either horizontal or vertical, or substantially so, when the target is in its intended orientation for use. Best results are obtained with diagonals that slope at angles in the region of 45 degrees, however, and preferably not outside of the range between 35 degrees and 55 degrees.

When the targets 60 and 61 are viewed stereoscopically by a patient having no asymmetrical tonic muscle imbalance, the markings will appear to be at the same distance from the patient and to lie in the projected plane of the targets. If the patient has symmetrical tonic muscle imbalance (or prism error) in the vertical meridian, one of the diagonals will appear to be in a plane closer than the other. This is compensated by effectively raising one of the X targets. The compensation necessary is a measure of the patient's vertical symmetrical tonic muscle imbalance.

Two other apparent changes in the markings on the X-targets of Figs. 1 and 2, that may appear when the targets are observed stereoscopically, are a rotation of the plane of the X about a vertical axis, hereinafter referred to as "turning," and a rotation of the plane of the X about a horizontal axis, hereinafter referred to as."tilting." These effects will be more easily understood after considering some other targets of the X-series.

Fig. 3 shows another target 67 with diagonal lines 68 and 69 that make larger angles with the horizontal than do the diagonals 63 and 64 of target 60. When these targets 60 and 67 are viewed stereoscopically, the patient fuses the lines 63 and 68, and also fuses the lines 64 and 69; but the plane defined by the fused lines, appears to be turned in a clockwise direction, as viewed from the top. The apparent position of the plane of the markings with respect to the projected plane of the targets is indicated in Fig. 4 where the projected plane of the targets is indicated by the reference character 60—67, and the apparent plane of the markings is indicated by the reference character 70.

Figs. 5 and 6 show targets that have diagonal markings correlated so as to cause an apparent turning of the plane of the marking in a counterclockwise direction, This result is obtained by having diagonal markings 73 and 74 on a target 77 at a smaller angle to the horizontal than are the diagonal markings 63 and 64 on the zero target 60. Figure 7 shows the plane 70 in which the diagonal markings of the targets 60 and 77 appears to lie when those targets are viewed stereoscopically and the patient fuses the diagonals 63 and 73, and the other diagonals 64 and 74.

A graphic solution for determining the apparent plane 70 of the diagonal markings on the targets 60 and 77 is shown in Figs. 8 and 9. In Fig. 8 the targets 60 and 77 are superimposed upon one another, and Fig. 9 is a diagrammatic sectional view through the superimposed targets at the level of the line 9—9. This section would be the same if taken at the level of the line 9'—9', except for a reversal of the reference characters that are applied to the diagonals.

In the graphic solution shown in Fig. 9 points on the lines 63, 64, 73 and 74 are used; these points being those at which the line or plane 9—9 intersects the diagonal lines. From the point 35, at which the right eye is located, lines 83 and 84 are drawn to the points 63 and 64, on the diagonals visible to the left eye. Similarly, lines 85 and 86 are drawn from the point 36 at which the right eye is located, to the points 73 and 74 on the diagonals which are visible to the right eye. The lines 84 and 86 intersect ahead of the projected plane of the targets, and the lines 83 and 85 intersect behind the projected plane of the targets, showing that the plane 70 in which the diagonals appear to lie has been given a counter-clockwise rotation by substituting the target 77 for the target 67.

When testing the patient's eyes with the X-targets 60, 61, 67 and 77, and other X-targets of the same series which differ from those shown merely by the differences in the angles between the diagonal markings, the patient first observes the zero targets 60 and 61 stereoscopically.

If the patient reports that the plane defined by the diagonals 63 and 64 appears to be closer to him on the left side, then another target, such as the target 67, is substituted for the zero target 61. The substituted target has the effect of making the plane of the diagonal markings appear to be closer to the patient on the right side, and by substituting various targets for the right eye, the examiner can find a target which compensates for the error in the patient's eyes and makes the plane of the diagonal markings coincident with the projected plane of the targets. The extent to which the plane 70 appears to turn depends upon the distance from the patient's eyes to the projected plane of the targets.

If the patient initially reports that the plane of the diagonal markings appears closer to him on the right side, then the targets, such as the target 77, having smaller angles of inclination between the diagonal markings and the horizontal are substituted for the right eye target until a target is found the compensates for the error.

Each of the targets 60, 61, 67 and 77, and the other X-targets of the set, has a legend in the upper left-hand corner of the targets for indicating the percent magnification of the respective targets.

The differences in the angles that the diagonal markings on the targets 61, 67, and 77 make with the horizontal are exaggerated in the drawing for clearer illustration. The percent magnification in the vertical meridian that will be compensated by the target 67 or 77 is proportional to the ratio obtained by taking the tangent of the angle that a diagonal of target 67 or 77 makes with the horizontal, subtracting from this tangent the tangent of the corresponding angle of the diagonal of the zero target 60, and then dividing this difference by the angle between the horizontal and the diagonal of the zero target.

If the examiner has to use a target having a plus 0.125 legend in order to make the apparent plane of the diagonal markings coincide with the projected plane of the targets, this indicates that there is a tonic muscle imbalance producing a magnification equal to 0.125 percent in the eye used to view the plus 0.125 target. This error is a resultant defect, and in order to find the asymmetrical tonic muscle imbalance in the vertical meridian, the results obtained with the line targets, described in my copending patent application Serial No. 768,672, filed August 14, 1947, now Patent No. 2,603,124, are subtracted from the results obtained with the X-targets shown in the drawing of this application.

Torsional tonic muscle imbalance causes the diagonal markings on the X-targets to appear to be in a plane that tilts forwardly or rearwardly. If the patient reports that the plane of the diagonals has tilt, then the examiner rotates one or both of the targets in its own plane or substitutes another target for one or both of the zero targets, and each of these substituted targets for correcting tilt of the plane has the bisector of either angle of the diagonals at a different angle to the horizontal than is the corresponding bisector of the zero target.

Figures 10 and 11 show two targets 90 and 91, respectively, on which the bisectors of the angles between the diagonal extend in different directions on the target for the right eye than on the target for the left eye.

The target 90 has diagonal lines 92 and 93 extending across its field, and the target 91 has diagonal lines 94 and 95. The correlation of these lines is shown clearly in Figure 12 in which the targets 90 and 91 are superimposed upon one another, and the apparent slope of the plane in which the diagonal lines appear to lie, when the targets 90 and 91 are viewed stereoscopically, is indicated in Figure 13 which is a view looking from the side edge of the plane of the targets.

Figures 14 and 15 are diagrams showing graphic solutions obtaining the apparent positions of the diagonals seen by a patient who views the targets 90 and 91 stereoscopically and fuses the diagonal 92 with the diagonal 94 and the diagonal 93 with the diagonal 95. These solutions are obtained by taking a horizontal plane 14—14 at one level through the superimposed targets of Figure 12, and locating the points at which the diagonals intersect this plane. These points are indicated in Figure 14 by reference characters of the diagonals. A similar plane 32 is then taken at another level through the superimposed targets of Figure 12, and lines are drawn from the positions of the right and left eyes to the points of those diagonals which are visible to the respective eyes.

The points at which the lines of vision intersect; are the points at which the eyes will fuse the respective diagonals at the levels of the planes 31 and 32, the solution being worked out in the same way as with Figure 9. From Figures 14 and 15 it is apparent that the fusion line 92—94 appears to be behind the projected plane of the targets at the level 14—14 and ahead of this projected plane of the targets at the level 15—15. Similarly the fusion line 93—95 appears to be further from the patient at the level 14—14 than at the level 15—15. This indicates that the plane defined by the fusion lines 92—94, 93—95 tilts rearwardly, that is, further from the patient at the top than at the bottom.

In testing the eyes, if the patient, when viewing the zero targets 60 and 61 reports that the plane of the diagonals tilts forwardly (plus) or rearwardly (minus), the examiner substitutes another target, such as the target 90 or 91, or both. By trying different targets, the examiner finds one that obtains the desired compensation, and these targets for correcting apparent tilt of the plane of the markings have legends thereon indicating the torsion angle for which the respective targets compensate. This torsion angle is part of the clinical data that is used for determining the prescription for correcting the patient's asymmetrical tonic muscle imbalance. The tests are made in the different positions of gaze and with the patient wearing any lenses that are necessary for correcting power errors of his eyes.

Figure 16 shows a chart for converting the clinical data obtained from the targets to the data necessary for the lens prescription. The clinical data required for use in the chart is the percentage magnification in the horizontal meridian, indicated by the letter "$P_h$"; and percentage magnification in the vertical meridian indicated by the letter "$P_v$"; and the angle of torsion, indicated by the letter "T." As previously explained, the value of $P_h$ is obtained from the line targets of my copending application Serial No. 768,672 now Patent No. 2,603,124; the value of $P_v$ is determined by subtracting the $P_h$ from the percentage magnification determined by the X-targets of Figures 1 to 9; and the value of T is determined from the torsional X-targets of Figures 10 to 15.

The chart of Figure 16 is used to find the meridional size difference, indicated by the letter "R"; the axis of meridian correction is indicated by the letter X; and the overall or spherical size correction, indicated by the letter "O."

The chart of Figure 16 is used by moving from the center to the right, "plus," or left, "minus," to the value of $P_v$ minus $P_h$ along the horizontal axis of the chart. From that point the user of the chart goes up "plus" or down "minus" to the horizontal line representing the value of T. The answer for R is then read along the nearest radius, or interpolated between adjacent radii and is in units the same as the abscissa (R is always +); the answer for X is read at the end of this nearest radius or interpolated radius, and O is equal to one-half of $$(P_v P_h - R)$$

Transposition to a more convenient form may be made if desired clinically after combining O with R at the cylinder axis.

The preferred embodiments of the invention have been illustrated and described, but changes and modifications can be made, and some features can be used alone or in different combinations without departing from the invention as defined in the claims.

What is claimed is:

1. A set of target members for testing the eyes of a patient for asymmetrical tonic extra-ocular muscle imbalance, said apparatus comprising a first target member having an observation field on which there are two intersecting diagonal lines serving as target means for observation by the right eye, a second target member having an observation field on which there are two corresponding diagonal lines serving as target means on said second target member for observation by the left eye, said corresponding target lines on the second target member being at the same angle of intersection and similarly located in the observation field as the target lines on the first target member for the right eye, and other target members for observation with the first or second target member, there being similar diagonal target lines on each of said other target members intersecting one another at angles which differ from those of said first and second target members, and also from one another, by known angular increments, the observation field on all of the target members being free of any target lines other than the intersecting diagonal lines, the various combinations of target members when viewed binocularly producing different apparent turning of the plane determined by the target lines in accordance with the degree of any muscular imbalance of the patient, there being indicia on the respective target members outside the observation field for indicating the position of each target member in the set of target members in the order of the different angles of intersection of the target lines from those of the other target members having the next most similar angles of intersection of its target lines.

2. The set of target members for testing the eyes, as described in claim 1, and in which the points of intersection of the target lines on all of the target members are similarly located in the observation field of the target member and the bisectors of the corresponding angles of intersection of all of the target lines on all of the target members extend in the same direction.

3. The set of target members for testing the eyes, as described in claim 1, and in which some of the angles of intersection of the diagonal lines on each of the target members are symmetrical about a horizontal line across the observation field and through the point of intersection of the lines, and others of the angles of intersection of the diagonal lines are symmetrical about a vertical line across the observation field and through the point of intersection.

4. The set of target members for testing eyes, as described in claim 1, and in which the intended field of observation of the respective target members are free of lines other than said intersecting diagonal lines.

5. The set of target members for testing eyes, as described in claim 1, and in which each of the target members has a mask which is carried by the target member and which has an opening therethrough exposing the intended field of observation of that target member, the openings in the masks for the target members for the right and left eyes, respectively, being incongruent so as to avoid fusion of the edges of the observation fields seen by a patient.

6. The set of target members for testing eyes, as described in claim 1, and in which the intersecting diagonal lines on the first two target members are each at an angle of approximately 45° to the vertical, and the lines on each of the other target members make different angles with the vertical within the range between approximately 35° and 55°.

7. The set of target members for testing eyes, as described in claim 1, and in which the diagonal lines on each of said target members, except the first two target members, are at different angles to one another but both at the same angle to the vertical.

8. The set of target members for testing eyes, as described in claim 1, and in which the bisectors of the corresponding angles between the diagonal lines on the first two target members make the same angle with the horizontal, and the bisectors of the corresponding angles of intersection of the diagonal lines on each of the other target members make angles with the horizontal different from one another and different from the angles of the first two targets.

References Cited in the file of this patent
UNITED STATES PATENTS

| | | |
|---|---|---|
| 1,650,768 | Reaves | Nov. 29, 1927 |
| 1,944,871 | Ames, Jr. et al. | Jan. 30, 1934 |
| 1,946,925 | Ames, Jr. | Feb. 13, 1934 |
| 2,095,235 | Ames, Jr. | Oct. 12, 1937 |
| 2,238,207 | Ames, Jr. et al. | Apr. 15, 1941 |
| 2,364,844 | Fuog | Dec. 12, 1944 |
| 2,419,939 | Ames | May 6, 1947 |
| 2,603,124 | Richards | July 15, 1952 |